Figure 1:
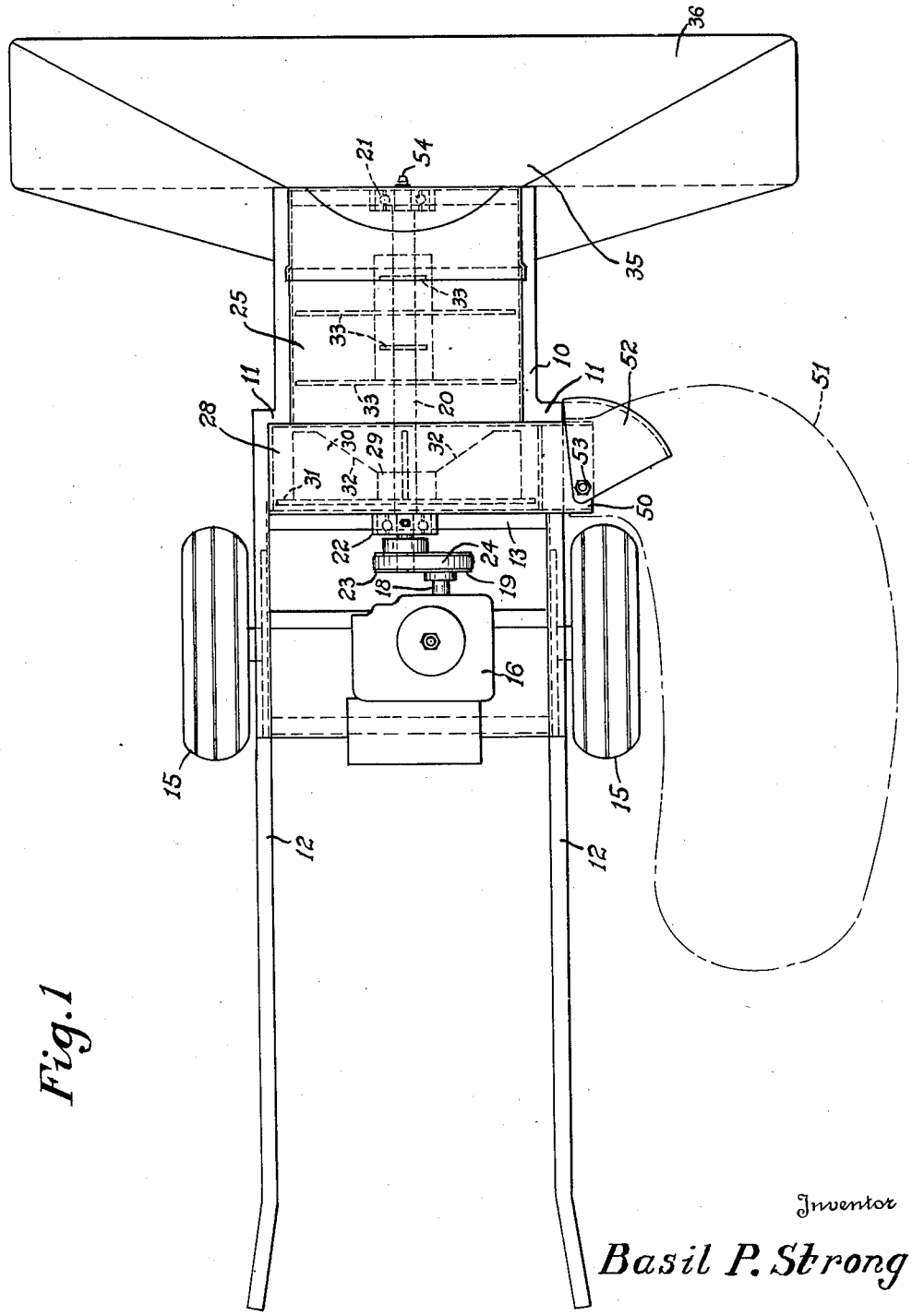

March 25, 1952 B. P. STRONG 2,590,734
LEAF MACHINE

Filed Dec. 8, 1945 2 SHEETS—SHEET 1

Inventor
Basil P. Strong
By Frease and Bishop
Attorneys

March 25, 1952  B. P. STRONG  2,590,734
LEAF MACHINE
Filed Dec. 8, 1945  2 SHEETS—SHEET 2
*Fig.2*
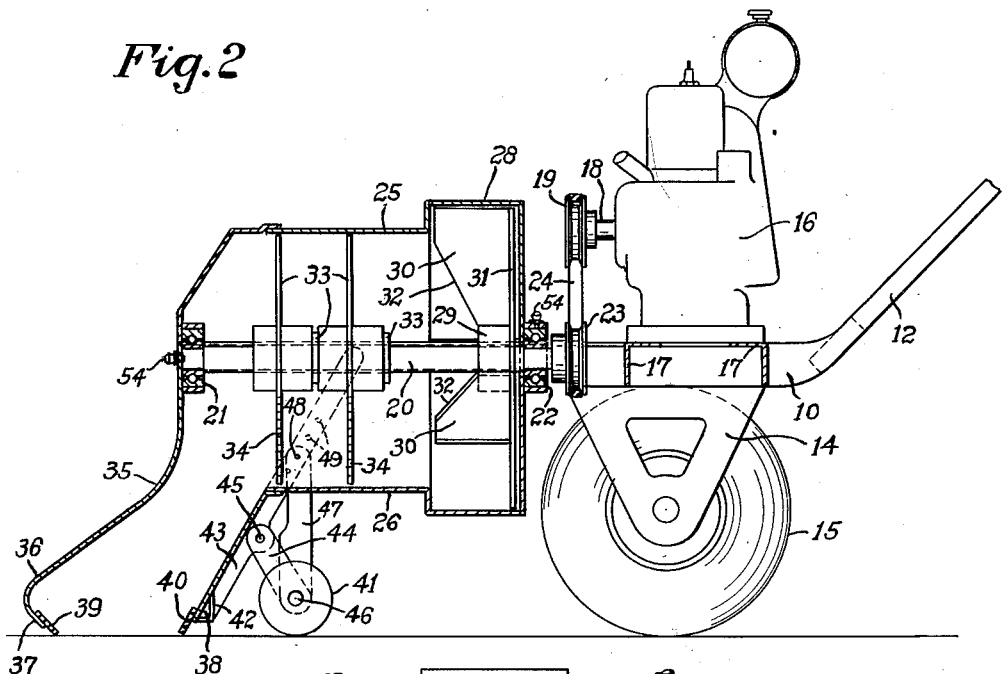
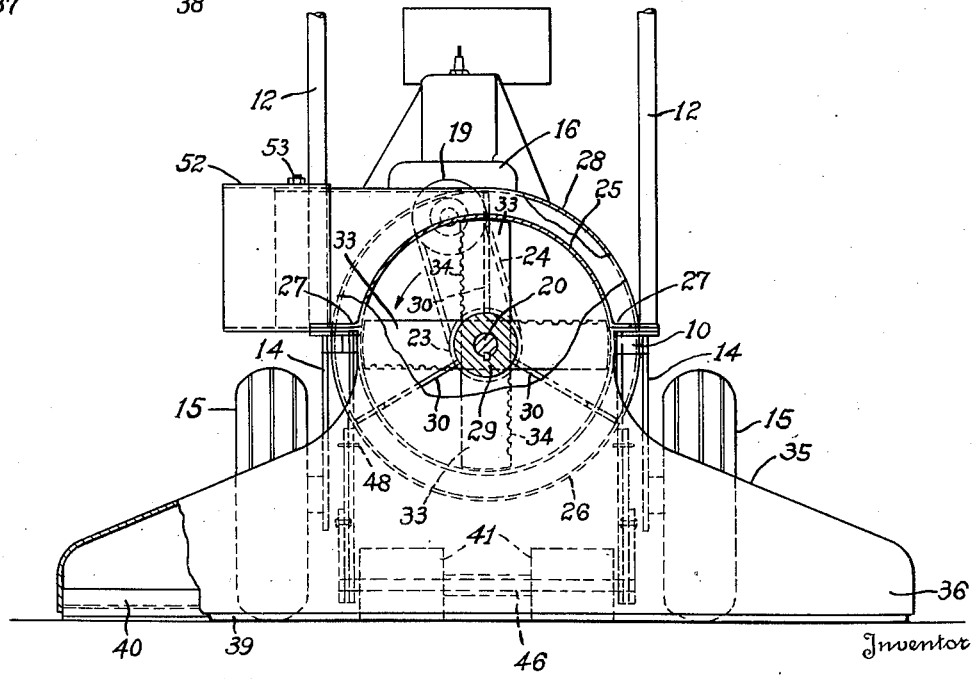
*Fig.3*
Inventor
Basil P. Strong
By Frease and Bishop
Attorneys Patented Mar. 25, 1952

2,590,734

UNITED STATES PATENT OFFICE 2,590,734

LEAF MACHINE

Basil P. Strong, Atwater, Ohio, assignor to Atwater-Strong Company, Atwater, Ohio, a corporation of Ohio Application December 8, 1945, Serial No. 633,825

9 Claims. (Cl. 55—118)

The invention relates to machines for removing leaves from lawns and similar places and more particularly to a portable suction machine having means therein for cutting the leaves into a pulp.

It is an object of the invention to provide a portable machine adapted to run over a lawn or other place littered with fallen leaves, cut grass, straw or similar vegetable matter, and having a vacuum fan therein for removing the leaves and the like by suction from the ground.

Another object is to provide a machine of this character having cutting means in the suction chamber for shredding the leaves into substantially a pulp.

Still another object is to provide a machine of the type referred to in which cutting knives are mounted upon the shaft of the vacuum fan.

A further object is to provide such a machine with means for spraying the shredded or pulped leaves back upon the lawn as the machine is moved thereover, so as to provide a top dressing which will quickly decay and produce leaf mold or humus around the grass roots of the lawn.

A still further object of the invention is to provide a machine of this type with an adjustable deflector for deflecting the chopped leaves as they are blown from the outlet of the fan chamber.

Another object is to provide such a machine with means for collecting the chopped or shredded leaf pulp so that the same may be later dumped upon a compost or humus pile if desired.

Still another object is to provide a simple and inexpensive power driven machine of the character referred to which will be easy to operate, efficient in use and durable in construction.

The above objects, together with others which will be apparent from the drawings and following description, or which may be later referred to, may be attained by constructing the improved leaf machine in the manner illustrated in the accompanying drawings, in which:

Figure 1 is a top plan view of a leaf collecting and cutting machine embodying the invention;

Fig. 2 a vertical, longitudinal, sectional view of the machine, and

Fig. 3 a front elevation of the machine, with parts broken away for the purpose of illustration.

In the embodiment of the invention disclosed herein, the machine is shown as mounted upon a frame indicated at 10, of generally U-shaped form, the legs of which may be off-set as indicated at 11, and having the handles 12 connected to their rear or terminal ends, a cross brace 13 being preferably connected at opposite ends to the legs of the frame intermediate their ends.

A pair of depending brackets 14 are fixed to the frame 10, and wheels 15, preferably rubber tired as illustrated are journalled upon said brackets for sustaining the weight of the machine and permitting it to be moved over the ground.

For the purpose of supporting the engine 16, or other source of motive power for the fan and cutting blades, a pair of angle bars 17 may be transversely disposed across the legs of the U-shaped frame and welded or otherwise attached thereto.

The shaft 18 of the engine or motor may be provided with a pulley 19 or its equivalent for the purpose of transmitting power to the fan shaft 20, as will be later described, or if desired, a direct drive may be provided, although a belt drive, as illustrated, is preferable in order to permit a certain amount of slippage in the event an obstacle is encountered by the fan or cutting blades.

The fan shaft 20 is journalled in suitable antifriction bearings 21 and 22 mounted upon the forward portion of the frame 10 and the cross bar 13 respectively, and a pulley 23 or its equivalent may be fixed upon the rear end of the shaft 20 and connected by a belt 24 to the pulley 19 upon the engine shaft.

A housing is provided for enclosing the fan and cutting blades, and is preferably of substantially cylindrical shape and composed of the upper and lower members 25 and 26 respectively, each being of substantially semi-cylindric shape, joined along opposite sides as indicated at 27, in any suitable manner to provide an air-tight vacuum chamber, the rear portion of which may be of slightly larger diameter, as at 28 to provide a fan chamber.

Within the fan chamber is located a suitable fan comprising the hub 29, fixed upon the shaft 20 and provided with the radial blades 30 closed at the rear side by the disc 31 and preferably inwardly tapered at their forward edges, as indicated at 32, as in usual vacuum fan construction.

One or more radially disposed cutting blades 33 are fixed upon the shaft 20, in front of the fan, and the leading edge of each blade is preferably provided with the cutting teeth 34 whereby when the blades are rotated in the direction of the arrow shown in Fig. 3, leaves or the like, which are passing through the vacuum chamber toward the fan will be cut into substantially a pulp before passing through the fan.

In cases where a plurality of these cutting blades are provided, as illustrated in the drawings, it is preferable that the several blades be located at angles to one another, as shown, as this arrangement not only provides for efficient cutting up of the leaves or other vegetation passing through the machine, but also tends to properly balance the shaft 20.

The suction nozzle, indicated generally at 35, is attached to the forward end of the casing 25—26 and the mouth or inlet portion 36 thereof is preferably considerably elongated transversely of the machine as illustrated, so as to cover a substantially wide path upon the lawn or other surface over which the machine is moved.

For the purpose of more readily loosening leaves which may be matted upon the lawn and causing them to be drawn into the suction nozzle of the machine, the front and rear lips 37 and 38 respectively of the nozzle, are provided with flexible strips 39 and 40 respectively, of rubber or the like, cemented or otherwise attached at their upper edges to the lips 37 and 38, the flexible strips extending below the edges of the nozzle and providing flexible lips for engagement with the objective surface.

In order to adjust the suction nozzle vertically relative to the ground so as to compensate for grass of different lengths, or other conditions of the surface to be cleaned, one or more adjustable rollers 41 may be provided for supporting the nozzle of the machine upon the ground.

A strip 42, of angle iron or the like may be welded or otherwise attached to the rear side of the nozzle adjacent to the rear lip 38 thereof to strengthen and reinforce the same. Two strips 43, of angle iron or the like may be attached to the rear side of the nozzle by any suitable means and extend upwardly from the horizontal strip 42.

For the purpose of adjustably mounting the rollers 41, a pair of lever arms 44 are pivoted as at 45 upon the strips 43 and the shaft 46, carrying the rollers 41, is carried by the free ends of the levers 44.

A link 47 is pivotably connected to each end of the shaft 46, and the upper ends of said links are adjustably connected to the strips 43 as by pins 48 selectively located through any one of the apertures 49 in the strips 43.

From the above it will be obvious that the rollers 41 may be adjusted downward or upward to locate the lips of the nozzle further spaced from or more closely adjacent to the ground as may be desired, and the rollers will be held in the adjusted position by means of the pins 48 selectively engaging the apertures 49.

In the operation of the machine to remove leaves from a lawn or the like, the handles 12 are grasped by the operator and the machine is moved forwardly upon the ground in the manner of the ordinary vacuum cleaner or hand operated lawn mower.

The forward, flexible lip 39 will flex to permit leaves to pass beneath the same into the mouth of the nozzle 35, while the rear flexible lip 40 will scrape upon the ground loosening any leaves which are matted into the lawn and causing them to be drawn by suction into the nozzle.

In places where the leaves may be thickly matted, the machine may be moved backward and forward over the same spot, the action of the flexible lips 39 and 40 alternating as the direction of the movement of the machine is changed, the forward lip 39 scraping up matted leaves from the grass upon backward movement of the machine, while the rear flexible lip 40 will flex to permit leaves to be drawn beneath the same into the nozzle.

Before reaching the fan the leaves will encounter the rapidly rotating cutting blades 33, the sharpened, serrated cutting edges of which chop the leaves into a fine pulp which may be discharged from the fan chamber through the outlet neck 50 into a bag 51 which may be constructed in the manner of the bags upon ordinary vaccuum cleaners. When the bag is filled with the chopped leaves, it may be dumped upon a compost pile or the like where the leaves will quickly decompose and form humus.

In the event it is desired to top dress the lawn with the disintegrated leaves so as to quickly form a leaf mold or humus top dressing upon the lawn, the bag 51 may be removed and the adjustable deflector 52, adjustably mounted upon the outlet neck 50, may be adjusted to the desired position by means of the adjusting bolt 53, and as the finely disintegrated leaf pulp is blown from the outlet neck of the machine it will be evenly deposited upon the lawn where it will work down into the grass and quickly decompose to produce a beneficial top dressing of humus.

For the purpose of properly lubricating the bearings 21 and 22, oil cups 54 may be provided so that the bearings may be lubricated from the exterior of the machine.

From the above it will be obvious that a simple, efficient and easily operated machine is provided for quickly and easily removing leaves or other vegetable litter from a lawn or the like and simultaneously disintegrating the same into a pulp which is capable of quickly decomposing so as to form a leaf mold or humus as in a compost pile, or depositing the same evenly upon the lawn as the machine passes thereover.

I claim:

1. A machine of the character described including a horizontal, cylindrical housing forming a vacuum chamber, an unrestricted suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a centrifugal fan in the vacuum chamber an outlet neck in the housing at one side of the fan and cutting means within the vacuum chamber between the fan and the nozzle for chopping material drawn therein into a pulp before it reaches the fan.

2. A machine of the character described including a horizontal, cylindrical housing forming a vacuum chamber, an unrestricted suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a fan shaft in the vacuum chamber, a centrifugal fan upon said shaft an outlet neck in the housing at one side of the fan, and cutting means upon said shaft between the fan and the nozzle for chopping material drawn therein into a pulp before it reaches the fan.

3. A machine of the character described including a horizontal, cylindrical housing forming a vacuum chamber, a suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a fan shaft in the vacuum chamber, a centrifugal fan upon said shaft an outlet neck in the housing at one side of the fan, and cutting means upon said shaft between the nozzle and the fan for chopping material drawn therein into a pulp before it reaches the fan.

4. A machine of the character described including a horizontal, cylindrical housing forming a vacuum chamber, a suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a fan shaft in the vacuum chamber, a centrifugal fan upon said shaft an outlet neck in the housing at one side of the fan, and a cutting blade upon the shaft between the nozzle and the fan for chopping material drawn therein into a pulp before it reaches the fan.

5. A machine of the character described including a horizontal, cylindrical housing forming a vacuum chamber, a suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a fan shaft in the vacuum chamber, a centrifugal fan upon the shaft an outlet neck in the housing at one side of the fan, and a plurality of cutting blades upon the shaft between the nozzle and the fan, said cutting blades being radially disposed on the shaft at angles to each other for chopping material drawn therein into a pulp before it reaches the fan.

6. A machine of the character described including a horizontal, cylindrical housing forming a vacuum chamber, an unrestricted suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a centrifugal fan in the vacuum chamber and cutting means within the vacuum chamber between the fan and the nozzle, for chopping material drawn therein into a pulp before it reaches the fan an outlet neck upon the vacuum chamber at one side of the fan for exhausting disintegrated material therefrom, and a deflector upon said outlet neck for distributing disintegrated material exhausted from the vacuum chamber upon the ground adjacent to the path of said machine.

7. A machine of the character described including a horizontal, cylindrical housing forming a vacuum chamber, an unrestricted suction nozzle communicating with the vacuum chamber said suction nozzle having a cross-sectional area equal to that of the cylindrical vacuum chamber at the point of connection thereto and increasing in area toward the lips of the nozzle, means for moving the machine upon the ground with the nozzle in close proximity to the surface, a centrifugal fan in the vacuum chamber an outlet neck in the housing at one side of the fan and cutting means within the vacuum chamber between the fan and the nozzle for chopping material drawn therein into a pulp before it reaches the fan and means for adjusting the nozzle vertically relative to the ground.

8. A machine of the character described including a housing forming a vacuum chamber, a suction nozzle communicating with the vacuum chamber, said nozzle having downwardly converging lips, and flexible strips connected at their upper edges to said lips and extending below the lips for contact with the ground, means for moving the machine upon the ground with the nozzle in close proximity to the surface, a fan in the vacuum chamber and cutting means within the vacuum chamber.

9. A machine of the character described including a horizontal cylindrical housing forming a vacuum chamber, an unrestricted suction nozzle communicating with the entire forward end of the vacuum chamber and depending therefrom, said suction nozzle increasing in cross-sectional area toward its lips, means for moving the machine upon the ground with the lips of the nozzle in close proximity to the surface, a horizontally disposed shaft located axially within the housing, means outside of the housing for rotating said shaft, a centrifugal fan mounted upon said shaft within the rear end of the housing, an outlet neck in the housing at one side of the fan, and a plurality of radially disposed cutting blades mounted upon the shaft within the vacuum chamber between the fan and the nozzle for chopping material drawn therein into a pulp before it reaches the fan.

BASIL P. STRONG.

REFERENCES CITED

The following references are of record in the file of this patent:

UNITED STATES PATENTS

| Number | Name | Date |
| --- | --- | --- |
| 1,844,750 | Ellis | Feb. 9, 1932 |
| 2,105,803 | Barnes | Jan. 18, 1938 |
| 2,340,944 | Easter | Feb. 8, 1944 |
| 2,436,011 | Lucas | Feb. 17, 1948 |
| 2,439,259 | McCormack | Apr. 6, 1948 |